Aug. 25, 1953  G. D. MARCY  2,649,617
APPARATUS AND PROCESS FOR VULCANIZING STRIP STOCK
Filed Sept. 1, 1951  3 Sheets-Sheet 2

INVENTOR.
Grosvenor D. Marcy
BY
Kenway, Jenney, Witter & Hildreth
Attys.

Aug. 25, 1953   G. D. MARCY   2,649,617
APPARATUS AND PROCESS FOR VULCANIZING STRIP STOCK
Filed Sept. 1, 1951   3 Sheets-Sheet 3
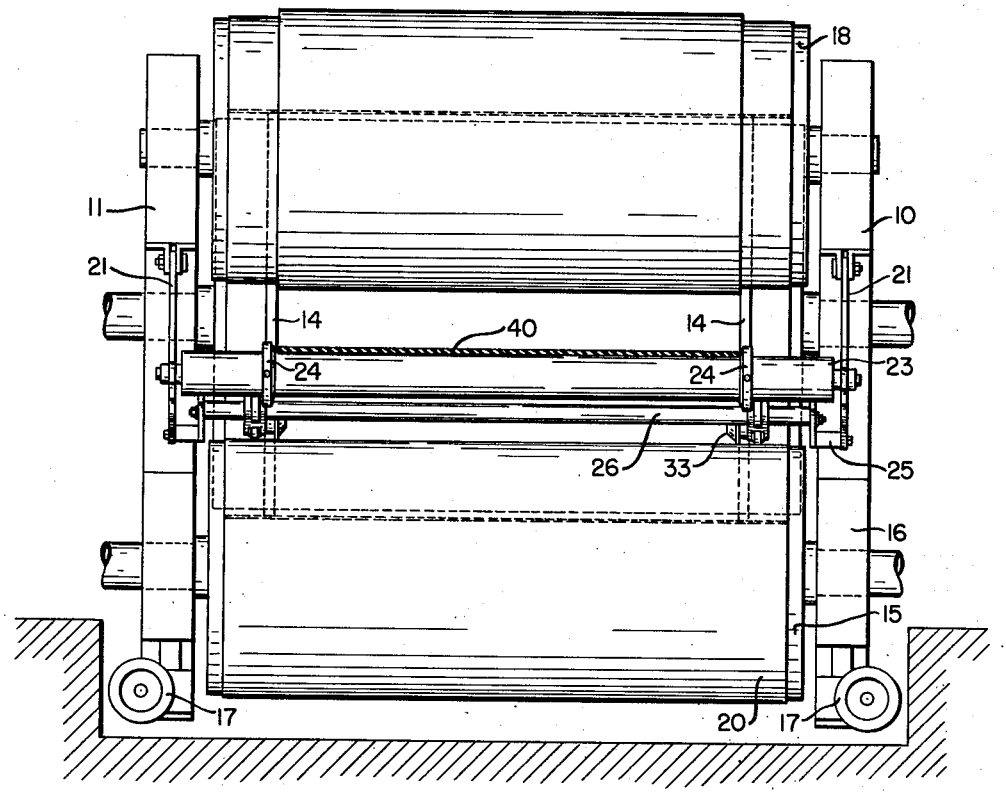
Fig. 4
Fig. 5
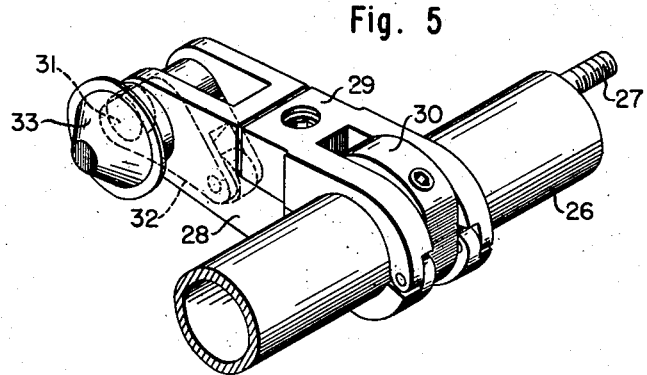
INVENTOR.
Grosvenor D. Marcy
BY
Kenway, Jenney, Witter & Hildreth
Attys.

Patented Aug. 25, 1953

2,649,617

UNITED STATES PATENT OFFICE 2,649,617

APPARATUS AND PROCESS FOR VULCANIZING STRIP STOCK

Grosvenor D. Marcy, Newton, Mass., assignor to Boston Woven Hose and Rubber Company, Cambridge, Mass., a corporation of Massachusetts Application September 1, 1951, Serial No. 244,837

13 Claims. (Cl. 18—6)

1

The present invention relates to rotary vulcanizing presses of the general type disclosed in the prior patent of John M. Bierer No. 2,179,443 in which strip stock such as rubberized belting is vulcanized or cured by being passed about a heated drum under pressure of a steel pressure band.

In one aspect the invention comprises an improvement upon the method and apparatus disclosed in my prior Patent No. 2,418,976. In another aspect it comprises an improved mechanism adapted to be applied to any rotary vulcanizing machine for directing the uncured stock into the bite of the band and drum in such a manner that it will not be prematurely heated by extended contact with the drum alone before it is subjected to curing pressure, and so also that it will be positioned properly to enter the curing channel which is slightly narrower than the uncured stock.

Heretofore difficulty has been encountered in directing the uncured stock in a point close to the bite of the press. If the stock makes any extended contact with the drum alone before it is subjected to pressure by the cooperative action of the drum and band, the stock is likely to become blistered. The mechanism of the present invention has the advantage of reducing the length of such preliminary contact of the stock and drum. It is usually desired to cure belting, for example, under considerable tension and this is accomplished in equipment of this nature by a tension device holding back the belting stock against the pull of the press to give the required degree of stretch to the belting. The apparatus and method disclosed in my prior Patent No. 2,418,976 solved this problem to some extent by utilizing rolls supported in external brackets on the frame and extending the full width of the press first to control the angle of approach of the belting to the bite of the press, and second to bend up the edges of the belt to insert them between the rings on the curing drum forming the sides of the molding channel.

The present invention achieves the same satisfactory results by the employment of simpler apparatus which is less expensive to construct, easier to install, maintain and adjust for stock of various widths and thicknesses. Heretofore the press time taken in setting up and changing over has been a very substantial item of cost. The present invention materially reduces that non-productive time and therefore achieves a real saving.

The improved results incident to the present invention are secured by controlling the path of the stock by reactive pressure against one of the rotating rolls which form the bite of the press. As herein shown, the uncured strip is introduced into the bite between the rotating heated drum and the roll-supported pressure band, and the path of the uncured strip is controlled by reactive pressure upon the band as it travels with the pressure roll. The novel mechanism by which this new process is carried out comprises a pair of spaced edge deflecting rolls supported for rotation by a wheel truck conforming to and reacting against the cylindrical surface of one of the pressure rolls.

These and other features of the invention will be best understood and appreciated from the following description of a preferred embodiment thereof selected for purposes of illustration and shown in the accompanying drawings in which:

Fig. 4 is an end view of the press on a smaller scale, and Fig. 5 is a detailed view in perspective showing one of the edge deflecting rolls and its supporting elements.

Figure 1:
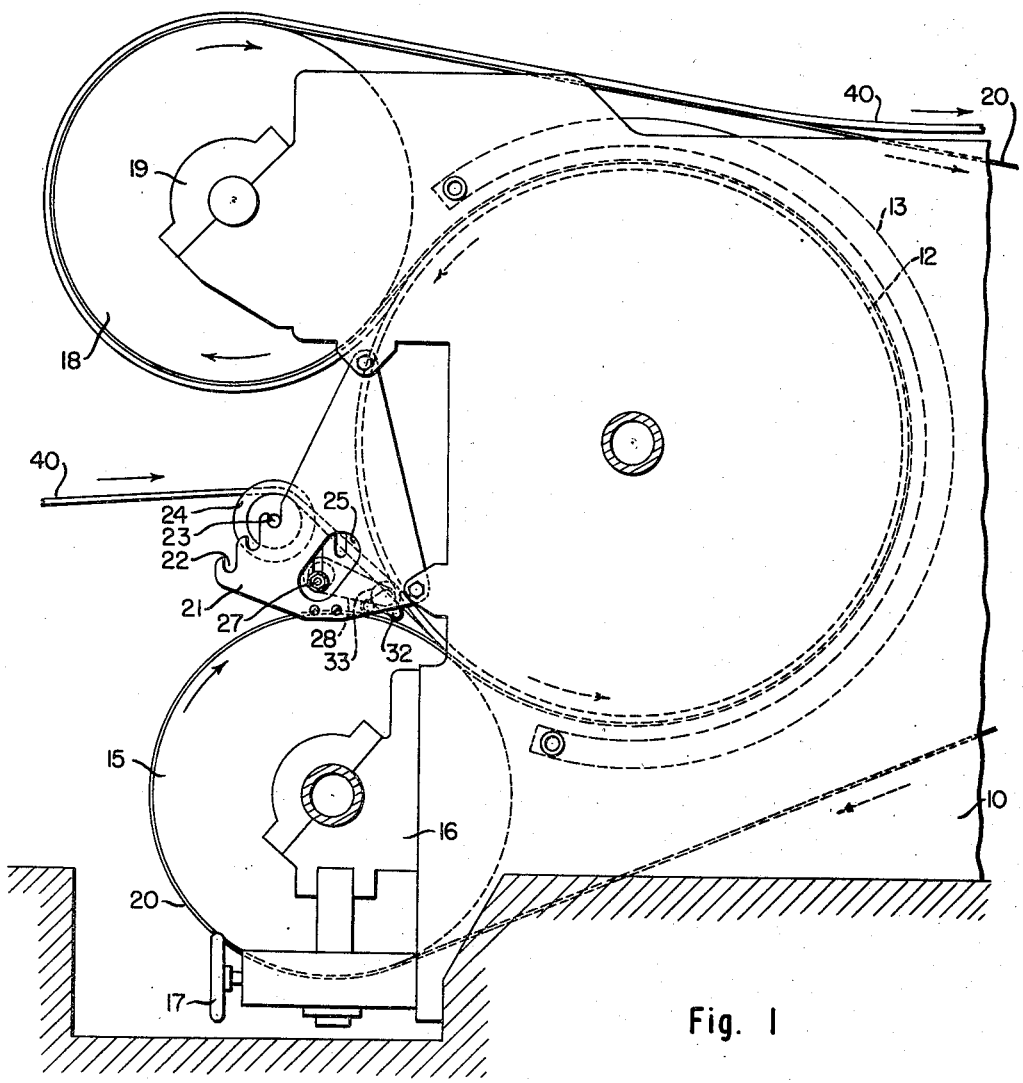
Fig. 1 is a diagrammatic view of a portion of the press in side elevation.

The vulcanizing machine illustrated in the drawings comprises a heavy metal frame including similar side members 10 and 11 rigidly connected and supported upon a concrete foundation. In the frame is journaled a large drum 12 which is internally heated and also surrounded in part by a segmental heater 13. Adjustably secured to the circumferential surface of the drum 12 is a pair of edge forming rings 14 which define the side edges of the curing channel into which the uncured strip stock is introduced.

A heated pressure roll 15 is journaled in bearing blocks 16 arranged to slide vertically in ways formed in the side frames 10 and 11 and controlled in position through rack and gear mechanism operated in each case by a hand wheel 17. An upper roll 18 is similarly mounted in bearing blocks 19 secured to the upper portion of the side frames. A wide steel pressure band 20 is led about the lower pressure roll 15, a substantial arcuate portion of the heated drum 12, the upper pressure roll 18 and a third roll, not shown, which is journaled in the rear portion of the frame and maintained at all times under hydraulic pressure so that a very substantial tension is created in the pressure band 20 and severe pressure exerted by the band upon strip stock passing about the circumference of the drum 12 and particularly when the stock is introduced between the band and the heated drum 12. The upper roll 18 is rotated slowly by driving means not herein shown in the direction of the arrow, and the drum 12 and other rolls are rotated as shown by the movement of the pressure band which acts as a driving belt.

The vulcanizing drum 12 is provided by the rings 14 with an open channel extending continuously about it and bounded on three sides by the surface of the drum and the two rings. The channel thus provides the bottom and two sides of a mold and the tension band 20 forms the top wall of the mold. The production of satisfactory belting requires that the mold shall be completely filled and the uncured belting brought firmly into intimate contact with the mold walls throughout their entire area and especially at the side walls which form the edges of the belting. This is accomplished by crowding into the channel uncured stock of slightly greater width than the width of the channel. The two edges of the uncured stock are directed into the channel while the intermediate portion is somewhat crowned or bulged and is then crowded fully into the molding channel by the action of the tension band.

Figure 2:
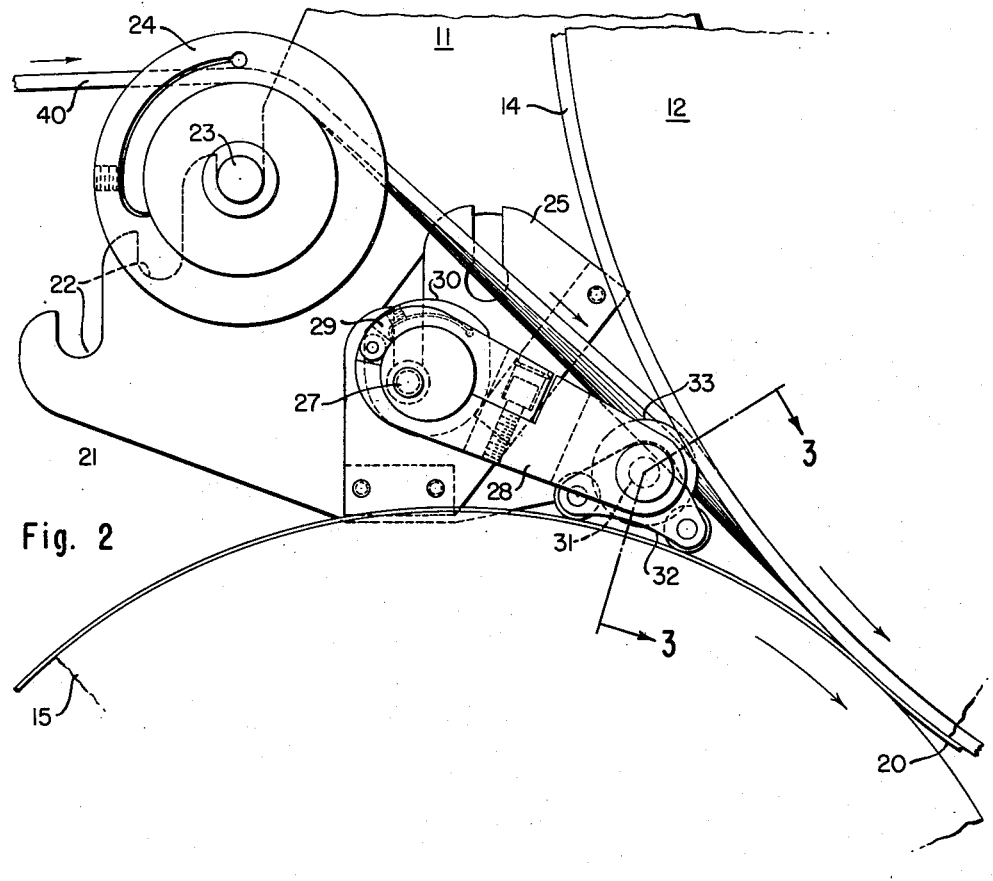
Fig. 2 is a similar fragmentary view on a larger scale, certain parts of the press being removed.

The mechanism herein disclosed for directing and controlling the path and shape of the uncured stock comprises a pair of brackets 21 bolted to the side frames and having notches 22 arranged in step formation for receiving a transverse shaft 23 having collars 24 adjustably secured thereto as best shown in Fig. 2.

To each of the brackets 21 is secured an auxiliary bracket 25 and supported between these brackets is a hollow transverse shaft 26 having eccentric threaded ends 27 which are received in vertical slots in the brackets 25. The auxiliary brackets 25 are herein shown as provided with two sets of vertical slots disposed in stepped relation, and the shaft 26 may be supported in either set of notches and adjusted in either position by reason of its eccentric end portions.

The hollow shaft 26 is utilized to support a pair of split carrier arms 28 each having a clamping section 29 which is forked to embrace a collar 30 secured in position upon the shaft 26 by a set screw as shown in Figs. 2 and 5. The clamping section 29 is pivotally connected to the rear end of the carrier arm and held in operative position by a countersunk bolt shown in dotted lines in Fig. 2. The carrier arm may be removed from the shaft 26 by removing the clamping bolt and opening the clamping section 29 about its axis of pivotal connection with the arm. The forward end of each carrier arm is forked and provided with a short transverse shaft 31. Mounted on this shaft between the forks of the carrier arm is a wheeled or rolled truck 32, the truck being arranged to ride upon the pressure band 20 in an area supported by the pressure roll 15 closely adjacent to the bite of the press as best shown in Fig. 2. The shaft 31 is supported by ball bearings in the forks of the carrier arm 28 and carries at its inner end a roll 33 having a conical face adapted to deflect upwardly the edges of the uncured stock 40 and a thin projecting flange which is arranged to run substantially in contact with the molding rings 14 of the drum 12.

In Figs. 1 and 2 the uncured stock 40 is shown as passing from tension mechanism (not shown) first into contact with the transverse guide roll 23 upon which it is located transversely by the rings 24, and then its marginal edges are engaged by the deflecting rolls 33, bent upwardly and crowded into the space between the rings 14 on the drum 12. This, as already noted, is in a location very close to the bite formed by the pressure band 20 and the drum 12 and the direction and control of the uncured stock is accomplished at this point by reaction pressure upon the band 20 and the drum 15 as the band travels with the pressure roll. Very shortly after leaving the deflecting rolls 33 the uncured stock 40 is engaged by the pressure band and enters the bite of the press. It is passed slowly under pressure about approximately 320° of the circumference of the drum 12 and is then directed with the pressure band about the circumference of the upper roll 18. It leaves this roll supported upon the pressure band and is finally directed away from the pressure band after being allowed to cool somewhat from the vulcanizing temperature.

Figure 3:
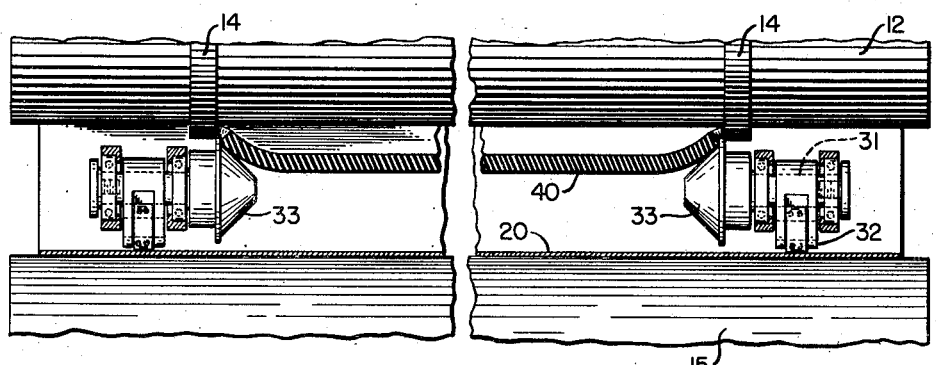
Fig. 3 is a fragmentary view looking into the bite of the press.

In Fig. 3 the uncured stock is represented as entirely supported by and between the edge deflecting rolls 33 and this is the condition usually occurring when the uncured stock is delivered under substantial longitudinal tension. In treating thin stock or stock delivered under light tension, some portion of the web sags and rests upon the pressure band 20 midway between the rolls 33. It will be apparent, however, that in both cases the path of the two longitudinal edges of the stock is fully controlled and determined by the action of the rolls supported by reactive pressure against the band. Since the strip stock is usually led to the machine under very substantial tension, the rolls 33 must exert a powerful deflecting pressure on the edges of the stock to direct them properly between the rings 14. This pressure is derived from reactive or supporting pressure against the band 20 where the latter is, in turn, supported by the pressure roll 15. This is in contrast to the construction disclosed in my prior patent where the deflecting rolls are supported by heavy brackets bolted to the side frames of the machine.

Having thus disclosed my invention and described in detail an illustrative embodiment thereof, I claim as new and desire to secure by Letters Patent:

1. In a rotary vulcanizing machine having cooperating pressure rolls mounted to provide a bite into which the uncured stock is directed, a pressure band guided into the bite of the rolls beneath the stock, a pair of spaced edge-deflecting rolls supported for rotation by the pressure band which in turn is supported by one of the pressure rolls.

2. In a rotary vulcanizing machine having cooperating pressure rolls mounted to provide a bite into which the uncured stock is directed, a pair of spaced edge-deflecting rolls located close to the bite, and a wheeled truck carrying each roll and conforming to and reacting against the cylindrical surface of one of the pressure rolls.

3. In a rotary vulcanizing machine having cooperating pressure rolls and a pressure band encircling one of said rolls, a pair of spaced trucks running upon the pressure band above one of said rolls and located adjacent the bite of the pressure rolls, and a freely rotating edge-deflecting roll carried by each truck.

4. In a vulcanizing machine, a rotary heated drum, a pressure roll and a pressure band supported thereby and forming a bite with said drum, a deflecting roll for directing the uncured stock into the bite of the drum and band, and roller means running on the moving pressure band for supporting the deflecting roll in its operative position.

5. A machine of the character described in claim 4 in which the roller means comprises a wheeled truck mounted to rock about an axis concentric with the deflecting roll.

6. A machine of the character described in claim 4 in which the truck and deflecting roll are mounted for adjustment toward and from the bite of the drum and pressure band.

7. In a machine of the character described having a heated drum and a cooperating roll-supported pressure band forming a bite into which the uncured stock is directed; an eccentrically supported shaft extending transversely across the machine, an arm detachably secured to the shaft and extending toward the bite, a short transverse shaft carried by said arm at its outer end, and an edge-deflecting roll freely rotatable about the axis of said shaft.

8. A machine of the class described comprising a heated drum, a cooperating pressure roll and a pressure band supported thereby in position to form a bite with the drum, stock molding rings on the drum, a pair of roller trucks running on the pressure band above the pressure roll, and guide rolls supported in position by the trucks and located substantially in transverse alignment with the molding rings of the drum.

9. In a machine of the class described having a heated drum and a heated pressure roll mounted to provide a bite into which the uncured stock is directed; a transverse shaft disposed in parallel relation to the axis of the pressure roll, guide rolls mounted for independent adjustment along said shaft, and supporting means for the guide rolls reacting with the pressure roll of the machine.

10. In a machine of the character described in claim 9; a transverse shaft mounted for bodily adjustment toward and from the bite into which the uncured stock is directed and carrying the said guide rolls.

11. A process of curing strip stock which consists in introducing the uncured stock into the bite of cooperating rotating heated pressure rolls and controlling the projected width of the uncured stock by reactive pressure against one of said rotating rolls.

12. A process of curing strip stock which consists in introducing the uncured stock into the bite between a rotating heated drum and a roll-supported pressure band and directing the path of the uncured stock at an angle with respect to the band by reactive pressure upon the band itself as it travels with the pressure roll.

13. The process of curing strip stock characterized by introducing the uncured stock into the bite between a heated rotating drum and a roll-supported pressure band, and continuously bending the two marginal edges of the stock with respect to its intermediate body portion by reactive rolling pressure against the band.

GROSVENOR D. MARCY.

References Cited in the file of this patent

UNITED STATES PATENTS

| Number | Name | Date |
|---|---|---|
| 1,522,234 | Freegard et al. | Jan. 6, 1925 |
| 2,159,543 | Baker | May 23, 1939 |
| 2,179,443 | Bierer | Nov. 7, 1939 |
| 2,179,444 | Bierer | Nov. 7, 1939 |
| 2,240,251 | Baker et al. | Apr. 29, 1941 |
| 2,296,372 | Smith et al. | Sept. 22, 1942 |
| 2,418,976 | Marcy | Apr. 15, 1947 |